United States Patent
Beani et al.

(10) Patent No.: US 12,220,788 B2
(45) Date of Patent: Feb. 11, 2025

(54) NOZZLE SYSTEM, POWDER BLASTING DEVICE AND METHOD FOR USING A NOZZLE SYSTEM

(71) Applicant: FERTON HOLDING S.A., Delémont (CH)

(72) Inventors: Florent Beani, Gex (FR); Marcel Donnet, Saint Jean de Gonville (FR); Maxime Fournier, Lausanne (CH); Karine Sauvageot-Maxit, Corbonod (FR); Patrick Pichat, Annemasse (FR); Tiago Bertolote, Le Grand-Saconnex (CH)

(73) Assignee: FERTON HOLDING S.A., Delémont (CH)

( * ) Notice: Subject to any disclaimer, the term of this patent is extended or adjusted under 35 U.S.C. 154(b) by 836 days.

(21) Appl. No.: 17/258,186

(22) PCT Filed: Aug. 7, 2019

(86) PCT No.: PCT/EP2019/071217
§ 371 (c)(1),
(2) Date: Jan. 6, 2021

(87) PCT Pub. No.: WO2020/030691
PCT Pub. Date: Feb. 13, 2020

(65) Prior Publication Data
US 2021/0276152 A1 Sep. 9, 2021

(30) Foreign Application Priority Data
Aug. 9, 2018 (EP) .................................... 18188331

(51) Int. Cl.
*B24C 5/04* (2006.01)
*A61C 3/025* (2006.01)
(Continued)

(52) U.S. Cl.
CPC ................ *B24C 5/04* (2013.01); *A61C 3/025* (2013.01); *A61C 17/0217* (2013.01); *B24C 7/0046* (2013.01); *B24C 7/0084* (2013.01)

(58) Field of Classification Search
CPC .. B24C 1/003; B24C 5/04; B24C 5/02; B24C 5/00; B24C 7/0046; B24C 7/0084;
(Continued)

(56) References Cited

U.S. PATENT DOCUMENTS 3,882,638 A 5/1975 Black
4,696,644 A * 9/1987 Goof ...................... A61C 3/025
433/125
(Continued)

FOREIGN PATENT DOCUMENTS

CN 102672625 A 9/2012
CN 102672625 B * 12/2016
(Continued)

OTHER PUBLICATIONS

Machine translation of DE-10254159-A1 (Year: 2004).*
(Continued)

*Primary Examiner* — Robert F Neibaur
(74) *Attorney, Agent, or Firm* — CANTOR COLBURN LLP (57) ABSTRACT

Nozzle system for a powder blasting device including a first nozzle element for transporting a powder-gas mixture stream along a transporting direction and a second nozzle element, where the second nozzle element surrounds the first nozzle element such that at least one channel is formed between the first nozzle element and the second nozzle element, where the channel is provided for transporting a liquid stream, where the first nozzle element and the second nozzle element are arranged such that in operation the powder-gas-mixture stream ejected by the first nozzle ele-
(Continued)

ment is encased by the liquid stream ejected by the channel for forming an output stream of the nozzle system, where the first nozzle element has an acceleration part having a first cross section and a spreading part having a second cross section, where the spreading part is arranged downstream of the acceleration part.

15 Claims, 5 Drawing Sheets

(51) Int. Cl.
    *A61C 17/02*     (2006.01)
    *B24C 7/00*     (2006.01)

(58) Field of Classification Search
    CPC ... B24C 7/0069; B24C 7/0076; B24C 7/0038; A61C 3/025; A61C 17/0217; A61C 17/02
    USPC .......................................................... 451/90
    See application file for complete search history.

(56) References Cited

U.S. PATENT DOCUMENTS

| | | | |
|---|---|---|---|
| 4,776,794 A | 10/1988 | Meller | |
| 5,601,478 A * | 2/1997 | Mesher | B24C 7/00 451/75 |
| 5,957,760 A | 9/1999 | Lasalle | |
| 6,935,576 B2 * | 8/2005 | Hara | B05B 15/55 239/398 |
| 7,442,112 B2 * | 10/2008 | Yoon | B24C 5/04 451/53 |
| 8,544,769 B2 * | 10/2013 | Calla | B05B 7/1486 239/548 |
| 9,713,511 B2 * | 7/2017 | Lifshitz | A61C 17/022 |
| 2013/0026247 A1 | 1/2013 | Calla et al. | |

FOREIGN PATENT DOCUMENTS

| | | | | |
|---|---|---|---|---|
| DE | 10254159 A1 * | 6/2004 | | B24C 1/003 |
| EP | 0248638 A2 | 12/1987 | | |
| JP | 2008093080 A | 4/2008 | | |
| WO | 03043519 A1 | 5/2003 | | |
| WO | WO-2012089359 A1 * | 7/2012 | | B24C 1/003 |

OTHER PUBLICATIONS

Machine translation of WO-2012089359-A1 (Year: 2012).*
Machine translation of CN-102672625-B (Year: 2016).*
International Search Report for corresponding application PCT/EP2019/071217 filed Aug. 7, 2019; Mail date Sep. 30, 2019.
Written Opinion of the International Searching Authority for corresponding application PCT/EP2019/071217 filed Aug. 7, 2019; Mail date Sep. 30, 2019.
International Preliminary Report on Patentability for corresponding application PCT/EP2019/071217 filed Aug. 7, 2019; Mail date Feb. 9, 2021.

* cited by examiner

NOZZLE SYSTEM, POWDER BLASTING DEVICE AND METHOD FOR USING A NOZZLE SYSTEM

TECHNICAL FIELD

The present disclosure refers to a nozzle system, a powder blasting device, and a method for using the nozzle system.

BACKGROUND

Nozzle systems in powder blasting devices are well known from the state of the art, for example from U.S. Pat. No. 3,882,638 A or EP 0 294 548 A1. Such nozzle systems are typically used for cleaning teeth, in particular for removing stains, tartar and colorations from teeth and for removing dental biofilms. In particular, the aim of using a powder blasting device is to clean dental surfaces and free them form stains, tartar biofilms and colorations without harming the tooth surface underneath which is enamel or dentine. According to the state of the art the powder is adapted to manipulate or to adjust a functionality of the output stream.

Preferably, nozzle systems provide a powder-gas mixture stream being encased by a liquid stream. The outlet stream, formed by the powder-gas mixture encased by the liquid stream, is directed on the tooth surface and causes the removing of stains, tartar coloration and/or dental biofilms. The liquid stream encasing the powder-gas mixture stream is provided for trapping dust generated and to avoid mist during operation of the powder blasting device.

In particular, there are materials being extra prone for abrasion, for example dentine, when the outlet stream is directed to a body formed by this material. In such cases even a "soft" powder might cause a too strong abrasion, disadvantageously. However, making the powder even "softer" would counteract the main function of the powder blasting device, namely removing stains and various dental deposits.

BRIEF SUMMARY

The disclosure provides a nozzle system for reducing abrasivity of an output stream ejected without reducing efficiency of removing stains, tartar dental deposits and/or dental biofilms.

According to the disclosure a nozzle system for a powder blasting device is provided, comprising
  a first nozzle element for transporting a powder-gas mixture stream along a transporting direction and
  a second nozzle element, wherein the second nozzle element surrounds the first nozzle element such that at least one channel is formed between the first nozzle element and the second nozzle element, wherein the channel is provided for transporting a liquid stream, wherein the first nozzle element and the second nozzle element are arranged such that in operation the powder-gas-mixture stream ejected by the first nozzle element is encased by the liquid stream ejected by the channel for forming an output stream of the nozzle system, wherein the first nozzle element has an acceleration part having a first cross section and a spreading part having a second cross section. It is provided that the spreading part is arranged downstream of the acceleration part and for reducing abrasivity of the output stream the second cross section is larger than the first cross section.

In contrast to the state of the art it is provided according to the present disclosure to modify an inner cross section of the first nozzle element, i.e. to modify an inner geometry of the first nozzle element, along the transporting direction. Thus, it is advantageously possible to reduce the abrasivity of the output stream without effecting its efficiency on the dental coverings which are to be removed. Thereby, particles of the powder-air mixture are accelerated inside the acceleration part for gaining speed. In the following spreading part the effective flow-cross-section of the powder-gas mixture is increased by the enlarged second cross section of the spreading part. In other words: the cross section of the powder-gas mixture stream is increased inside the first nozzle element in flow direction, in particular inside the spreading part of the first nozzle element. As a result, the envelope of the powder-gas mixture has an enlarged cross section, when it is ejected from the nozzle system, and therefore a larger surface can be treated by the output stream. Consequently, a cleaning surface is enlarged and powder abrasitivty is reduced, simultaneously. In addition, a sound shock being generated otherwise outside of the nozzle system, preferably at its front end, is generated inside the nozzle system. Therefore, the noise caused by the nozzle system in operation is advantageously reduced for giving an operator and/or a patient a more comfortable impression/feeling.

Another positive effect is the possibility of enlarging the cross section of the ejected output stream without increasing an air flow rate. Thus, it can be avoided that too much air is used during a treatment, which otherwise would increase an emphysema risk, i.e. pushing air within tissues. Another positive effect of increasing the cross section of the outlet stream, in particular of the cross section of the powder-gas mixture, is an opportunity to create or manipulate different nozzle properties without changing a base unit in charge of supplying the nozzle system with air and/or powder, since the air flow rate remains constant as well as the powder flow rate. For example, it is advantageously possible to adapt an air speed of the ejected output steam as well as its pressure. Another positive effect of the nozzle system of the present disclosure is that less liquid (e.g. water) is needed and therefore used when using the powder blasting device comprising the nozzle system of the present disclosure. This may be due to the fact that the liquid stream is better spread and is therefore more efficient in entrapping the powder and/or powder-gas mixture stream.

Preferably, abrasivity defines an efficiency of removing particle from a material surface during a treatment. For example, the abrasivity is specified by the ratio of the crater depth generation rate over powder quantity. The larger-value, the bigger the abrasivity, i.e. more particles of the treated material are removed from the surface. A reduction of abrasivity is preferably referenced to a first nozzle element having a constant cross section, in particular a constant first cross section of the acceleration part.

Preferably, the first nozzle element and/or the second nozzle element have a sleeve like body, wherein the first nozzle element is arranged inside the second nozzle element, in particular concentrically. In particular, the first nozzle element and the second nozzle element end or terminate at a front end of the nozzle system. Furthermore, it is conceivable that the first nozzle element and the second nozzle element end along the transporting direction simultaneously, i.e. in a plane perpendicular to the transporting direction. Alternatively, the first nozzle element protrudes at the front end of the nozzle system. Especially, the nozzle system is incorporated into a handheld device of a powder blasting device, such that an operator can easily direct the output stream onto the object to be treated. Furthermore, it is provided that the spreading part forms the end of the first nozzle element in transporting direction. Furthermore, the spreading part follows downstream to the acceleration part, preferably directly afterwards.

In a preferred embodiment it is provided that the acceleration part has a first cross section being constant in a direction extending along the transporting direction and/or the spreading part has a second cross section being at least partially constant in a direction extending along the transporting direction. Preferably, the second cross section is constant over its whole extension along the transporting direction. Alternatively, the acceleration part and/or the spreading part have subsections having different cross sections. In particular, the cross section of these subsections increases in transporting direction, such that the subsection at the end of the acceleration part and/or spreading part has the largest cross section of all cross sections assigned to the subsections. Especially, the acceleration part has a first length being longer than 0.5 mm, preferably longer than 0.75 mm and more preferably longer than 1 mm.

In another preferred embodiment of the present disclosure it is provided that the first cross section has a first width measured perpendicular to the transporting direction and a second cross section has a second width measured perpendicular to the transporting direction, wherein the second width is up to three times, preferably up to 2.5 times and most preferably up to 2 times, in particular mainly 1.5 times, larger than the first width and/or wherein the first width has a width between 0.1 and 2.5 mm, preferably between 0.25 and 1.5 mm and most preferably 0.6 mm. By these dimensions of the acceleration part and the spreading part a significant reduction of the abrasivity can be realized. In the case of several subsections or a varying second cross section within the spreading part, the second cross section and/or a second width of the second cross section is preferably a mean value of all second cross sections or second widths of all subsections along the transporting direction.

Preferably, it is provided that the first nozzle element comprises a collecting part, wherein the collecting part is arranged upstream to the acceleration part, wherein the collecting part has a third cross section being preferably at least partially constant along the transporting direction. In particular, it is provided that the acceleration part follows directly downstream to the collection part. The collection part directs the powder-gas mixture preferably of the acceleration part. For example, a funnel shaped subsection of the collecting part, in particular in a transition area between the collecting part and the acceleration part, directs the powder-gas mixture inside the acceleration part. In particular, the acceleration part, the collecting part and/or the spreading part are arranged adjacent and/or concentrically to each other.

In another preferred embodiment, it is provided that the third cross section is larger than the first cross section, wherein
  a third width of the third cross section is up to three times, preferably up to two times and most preferably up to 1.6 times, in particular mainly 1.2 times, larger than the first width, wherein the first width has a width between 0.1 and 2.5 mm, preferably between 0.25 and 1.5 mm and most preferably 0.6 mm In particular, an inner curvature of the first nozzle element in a transition area or in the spreading part has a step-like and/or a cone-like shape. Forming the inner curvature in the spreading part in a step-like and/or cone like manner represents another advantageous possibility to manipulate the form of the cross section of the powder-gas mixture stream being ejected at the front end. In particular, the transition area forms a transition between the collecting part and the acceleration part and/or a transition between the acceleration and the spreading part.

Furthermore, it is preferably provided that the acceleration part has a first length measured along the transporting direction and the spreading part has a second length measured along the transporting direction, wherein the second length is 0.5 to 3.5 times, preferably 1.1 to 2 times and most preferably 1.3 to 1.8 times, longer than the first length. Especially, the acceleration part has a first length being longer than 0.5 mm, preferably longer than 0.75 mm and more preferably longer than 1 mm. By choosing a comparably large spreading part, it is advantageously possible to establish a homogeneous powder density across a plane being perpendicular to the transporting direction at the front end. Alternatively, it is also conceivable that the second length is shorter than the first length.

In another preferred embodiment it is provided that the liquid stream is ejected from the channel via an output surface, wherein the channel is preferably configured such that the liquid stream encasing the powder-gas mixture stream is formed by droplets. By encasing the powder-gas mixture by droplets instead of a closed liquid stream it is advantageously possible to increase an ability of trapping dust powder by the liquid. As a consequence, less liquid, for example water, is needed in operation of the nozzle system, which is beneficial for a comfort of the patient. Another consequence is that less dust is generated and therefore less clogging of the nozzle system channels occur after repeated used. Preferably, the output surface, in particular a fourth cross section assigned to the output surface, has a structure or profile that supports the droplet formation.

In particular, it is provided that the output surface has a fourth cross section, wherein the fourth cross section preferably has a size between 0.1 and 0.9 $mm^2$, preferably between 0.3 and 0.6 $mm^2$ and most preferably between 0.3 and 0.4 $mm^2$. Thus, a fourth cross section is realized that is smaller than the fourth cross sections typically known from the prior art. The reduction of the fourth cross section supports the formation of the droplets at the front end of the nozzle system advantageously.

According to another aspect of the disclosure a nozzle system for a powder blasting device is provided, comprising A nozzle system for a powder blasting device, comprising

- a first nozzle element for transporting a powder-gas mixture stream along a transporting direction and
- a second nozzle element, wherein the second nozzle element surrounds the first nozzle element such that at least one channel is formed between the first nozzle element and the second nozzle element, wherein the channel is provided for transporting a liquid stream, wherein the first nozzle element and the second nozzle element are arranged such that in operation the powder-gas-mixture stream ejected by the first nozzle element is encased by the liquid stream ejected by the channel via an output surface for forming an output stream of the nozzle system, wherein the output surface has a fourth cross section, wherein the fourth cross section has a size between 0.3 and 0.4 $mm^2$.

Preferably, it is provided that the fourth cross section is formed undulated or as a slit, an assembly of holes and/or assembly of grooves. Thus, it is advantageously possible to adapt the fourth cross section profile determining how the liquid is ejected from the nozzle system, in particular from the channel. Thereby, it is preferably provided that the fourth cross section of the output surface comprises six or more openings for ejecting the liquid stream. It is also conceivable that the fourth cross section comprises less than six openings. Preferably, the holes and/or grooves are distributed homogeneously or statistically along a circumferential direction. The holes might have a circular, rectangular elliptical shape and/or any other shape or a combination thereof.

In particular, it is provided that an outer curvature of the first nozzle element defines the shape of the fourth cross section, wherein the outer curvature of the first nozzle element comprises at least one recess being curved inwardly. Preferably, the recess is formed arched parabolic and/or circularly in a circumferential direction. In other words: the outer curvature of the first nozzle element is an integral part of the channel, in particular defines the structure/profile of the fourth cross section at the front end. For example, the outer curvature/side of the first nozzle element is configured with regard to the inner surface of the second nozzle element, which is preferably circular, such that a set of sub-channels extending parallel to the transporting direction is realized. In particular, each end of the subchannels forms an opening being part of the fourth cross section. Preferably the extension of the sub-channels is at least as long as the second length of the acceleration part.

Alternatively, it is provided that an inner curvature of the second nozzle element defines the shape of the fourth cross section, wherein the inner curvature of the second nozzle element comprises at least one recess being curved outwardly. Preferably, the recess is formed arched parabolic and/or circularly in a circumferential direction. In other words: the inner curvature of the second nozzle element is an integral part of the channel, in particular defines the structure/profile of the fourth cross section at the front end. For example, the inner curvature/side of the second nozzle element is configured with regard to the outer surface of the first nozzle element, which is preferably circular, such that a set of subchannels extending parallel to the transporting direction is realized. In particular, each end of the sub-channels forms an opening being part of the fourth cross section. Preferably the extension of the sub-channels is at least as long as the second length of the acceleration part. Alternatively, the shape of the fourth cross section can be defined by the insertion of elements between the first and second nozzle elements.

In another embodiment of the present disclosure it is provided that in a direction parallel to the transporting direction the first nozzle element extends further than the second nozzle element or the first nozzle element and/or the second nozzle element ends at a common plane being perpendicular to the transporting direction. In other words: the first nozzle element protrudes at the front end relative to the second nozzle element along the transporting direction or does not protrudes at the front end. Thus, the form of the output stream can be further manipulated. In particular the first nozzle element does not protrude further than 1 mm, preferably further than 0.8 mm and most preferably 0.5 mm.

Another aspect of the present disclosure is a powder blasting device comprising the nozzle system according to the present disclosure. All features and benefits mentioned in the context of the nozzle system can be transferred to the powder blasting device and vice versa.

Another aspect of the present disclosure is a method for using a nozzle system according to the present disclosure, in particular in a powder blasting device. All features and benefits mentioned in the context of the nozzle system can be transferred to the method and vice versa.

In a preferred embodiment it is provided that the output stream has a fifth cross section that differs from a circularly formed cross section.

Wherever not already described explicitly, individual embodiments or their individual aspects and features can be combined or exchanged with one another without limiting or widening the scope of the described disclosure, whenever such a combination or exchange is meaningful and in the sense of this disclosure. Advantages which are described with respect to one embodiment of the present disclosure are, wherever applicable, also advantageous of other embodiments of the present disclosure.

DETAILED DESCRIPTION

Figure 1:
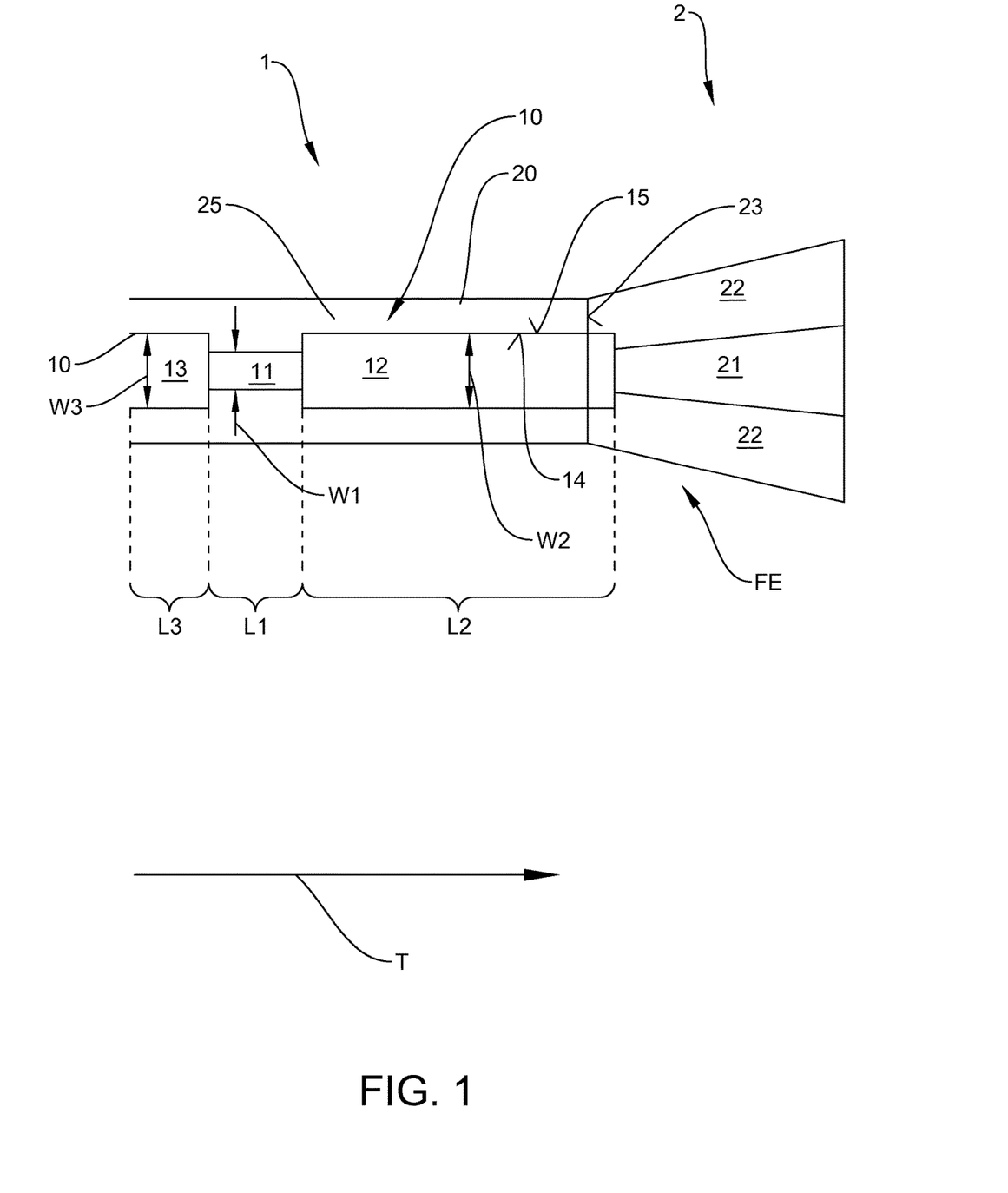
FIG. 1 schematically shows a nozzle system according to a preferred embodiment of the present disclosure, FIG. 2 schematically shows a first nozzle element according to the state of the art FIG. 2a to 2d schematically show different preferred embodiments of a first nozzle element for a nozzle system according to the present disclosure FIG. 3 schematically shows a perspective view on a front end of a nozzle system according to the state of the art FIGS. 3a to 3i schematically show different preferred embodiments for nozzles systems according to the present disclosure in a perspective view directed on the front end of the nozzle system and FIG. 4 a fifth cross section assigned to the output stream.

In FIG. 1 a nozzle system 1 according to a preferred embodiment of the present disclosure is presented in a sectional side view along a transporting direction T. Such nozzle systems 1 are preferably an essential part of a powder blasting device. Those power blasting devices are preferably used for removing stains, tartar or a coloration from a tooth and/or for removing dental biofilms. The nozzle system 1 provides an output stream 2 that is able to remove stains and coloration and/or to remove dental biofilms. In operation, the output stream 2 is ejected by the nozzle system 1 at its front end FE.

Besides a powder-gas mixture stream 21 the output stream 2 comprises a liquid stream 22 in order to guide the powder-gas mixture stream 21 and to trap dust generated and to avoid mist during operation. In particular, the powder-gas mixture stream 21 is encased or surrounded at least partially, preferably completely, by the liquid stream 22 in a plane expanding perpendicular to a transporting direction T of the output stream 2. For realizing such an output stream 2 the nozzle system 1 comprises a first nozzle element 10 for transporting a powder-gas mixture stream 21 along the transporting direction T and a second nozzle element 20, wherein the second nozzle element 20 surrounds the first nozzle element 10 such that at least one channel 25 is formed between the first nozzle element 10 and the second nozzle element 20. Preferably, the first nozzle element 10 and/or the second nozzle element 20 have a sleeve—like body, wherein the first nozzle element 10 is arranged inside the second nozzle 20 element, in particular concentrically to each other. Preferably, the output stream 2 is ejected from the nozzle system 1 at a front end FE or a front side of the nozzle system 2. Preferably, the first nozzle element 10 extends further than the second nozzle element 20 in a direction extending parallel to the transporting direction T. Alternatively, the first nozzle element 10 and the second nozzle element 20 end in a common plane that extends perpendicular to the transporting direction T.

For improving a quality of the output stream 2, in particular regarding a reduced abrasivity in operation, it is provided to adapt a geometry of the first nozzle element 10. In particular, the first nozzle element 10 has an acceleration part 11 having a first cross section and a spreading part 12 having a second cross section, wherein the spreading part 12 is arranged downstream of the acceleration part 11. Thereby, the particles of the powder-gas mixture stream 21 are accelerated inside the acceleration part 11 and thus gain speed during their transport inside the acceleration part 11. The spreading part 12 is configured such that the particles of the powder-gas mixture stream 21 are spread. For realizing the spreading inside the spreading part 21 it is preferably provided that the second cross section is larger than the first cross section. In particular the acceleration part 11 is arranged directly next to the spreading part 12 in a direction extending parallel to the transporting direction T.

In particular, it is provided the first cross section has a first width W1 measured perpendicular to the transporting direction T and a second cross section has a second width W2 measured perpendicular to the transporting direction T, wherein the second width W2 is up to three times, preferably up to 2.5 times and most preferably up to 2 times, in particular mainly 1.5 times, larger than the first width W1 and/or wherein the first width W1 has a width between 0.2 and 1.5 mm, preferably between 0.4 and 0.9 mm and most preferably 0.6 mm. By enlarging the cross section, in particular by using the mentioned dimensions of the first width W1 and the second width W2, it is advantageously possible to reduce the abrasivity of the output stream 2. Further, a sound shock is generated inside the nozzle system 1 and not at the front end of the nozzle system 1. As a consequence, noises generated by the nozzle system 1 during operation can be reduced for giving an operator and/or patient a more comfortable impression. Additionally, it is possible to enlarge an absolute output cross section of the powder-gas mixture stream 12 being ejected by the first nozzle element 10 without increasing an air flow rate. As a consequence of the enlarged output cross section of the powder-gas mixture stream 21, an emphysema risk is reduced and a wider range of properties regarding the output stream 2 can be established, for example a thinner or larger output stream measured in a direction perpendicular to the transporting direction T.

Further, it is provided that in a direction extending parallel to the transporting direction T a curvature/inner side 14 of the first nozzle element 10 has a step-like shape for forming a transition between the acceleration part 11 and the spreading part 12. Furthermore, it is provided that the acceleration part 12 is arranged concentrically to the spreading part 12. Thus, a homogeneous spreading can be guaranteed.

Furthermore, the first nozzle element 10 comprises a collecting part 13, wherein the collecting part 13 is arranged upstream to the acceleration part 11, wherein the collecting part has a third cross section being preferably constant along the transporting direction T. By using the collecting part 13 it is advantageously possible to prepare particles for entering the acceleration part 11 properly. The third cross section might correspond to the second cross section of the spreading part 12 or might be different form the second cross section, for example regarding size and steps, i.e. a form of the inner side 14 of the first nozzle element 10. In particular, the inner curvature/side 14 of the first nozzle element 10 has another step-like shape forming the transition from the collecting part 13 to the acceleration part 11. It is also conceivable the transition between the collecting part 13 and the acceleration part 11 is funnel shaped. In particular, the third cross section is larger than the first cross section, wherein a third width W3 of the third cross section is up to three times, preferably up to two times and most preferably up to 1.6, in particular mainly 1.2 times, larger than the first width, wherein the first width has a width between 0.2 and 1.5 mm, preferably between 0.4 and 0.9 mm and most preferably mainly 0.6 mm.

Moreover, the acceleration part 11 has a first length L1 measured along the transporting direction T and the spreading part 12 has a second length L2 measured along the transporting direction T, wherein the second length L2 is 0.5 to 3.5 times, preferably 1.1 to 2 times and most preferably 1.3 to 1.8 times, longer than the first length L1. In particular, the first length L1 should be longer than 0.5 mm.

Furthermore, it is provided that the channel 25 is configured such that a small/thin liquid jet is generated for the output stream 2. In particular, an output surface 23 from which the liquid jet is ejected preferably has comparable small fourth cross section. Preferably, the fourth cross section is measured in a plane extending perpendicular to the transporting direction T at the front end FE. Hereby, all openings used and/or being available for ejecting the liquid stream preferably form the fourth cross section, i.e. the fourth cross section might be formed by sub-cross sections assigned to several separated or individual openings at the front end for ejecting the liquid stream 22. In particular, the fourth cross section has a structure or profile formed by a plurality of openings that for example are arranged circumferential at the front end FE of the channel 25, preferably uniformly along a circle. In particular, the fourth cross section preferably has a size between 0.1 and 0.8 mm$^2$, preferably between 0.6 and 0.3 mm$^2$ and most preferably between 0.3 and 0.4 mm$^2$. In contrast to that, the forth cross section according to the state of the art is larger than 0.8 mm$^2$.

In particular, the fourth cross section is preferably configured such that the liquid stream 22 encasing the powder-gas mixture stream 12 is formed by droplets. Due to the use of droplets it is advantageously possible to increase a probability of the liquid to trap dust powder. Furthermore, a controlled liquid stream 22 supports directing or guiding of the powder—gas mixture stream 21.

Such geometry of the channel 25 allows by itself to reduce the abrasivity of the output stream. Therefore, a nozzle system (1) for a powder blasting device is provided, comprising
a first nozzle element (10) for transporting a powder-gas mixture stream (21) along a transporting direction (T) and
a second nozzle element (20), wherein the second nozzle element (20) surrounds the first nozzle element (10) such that at least one channel (25) is formed between the first nozzle element (10) and the second nozzle element (20), wherein the channel (25) is provided for transporting a liquid stream (22), wherein the first nozzle element (10) and the second nozzle element (20) are arranged such that in operation the powder-gas-mixture stream (21) ejected by the first nozzle element (10) is encased by the liquid stream (22) ejected by the channel (25)) via an output surface (23) for forming an output stream (2) of the nozzle system (1), wherein the output surface (23) has a fourth cross section, wherein the fourth cross section has a size between 0.3 and 0.4 mm² for reducing abrasivity of the output stream.

Figures 2, 2A:
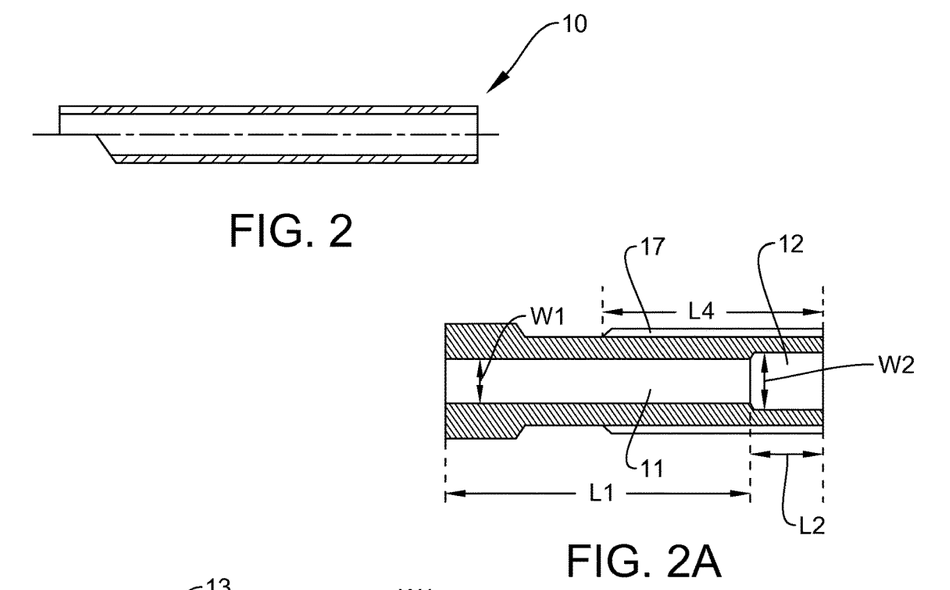
Figure 2B:
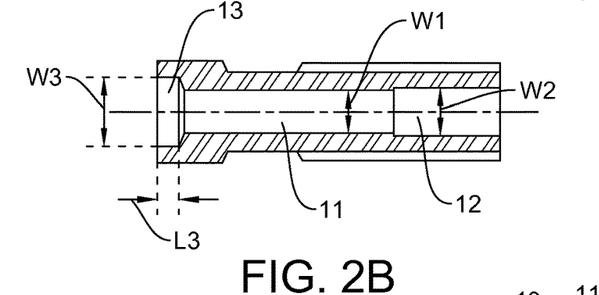

In FIG. 2 a first nozzle element 10 according to the prior art is presented for comparing it to the geometries of the first nozzle elements 10 of the FIGS. 2a to 2d representing different exemplary embodiments of first nozzle elements 10 for a nozzle system 1 according to the present disclosure. In particular, FIG. 2a shows a first nozzle element 10, assigned to a nozzle system 1 being named EA-5698 in the following, which has no collecting part. Further, the first nozzle element 10 has a comparable long acceleration part 11 compared to the spreading part 12. The elements 17, such as struts or rips, extending at an outer side 15 of the first nozzle element 10 are intended for realizing sub-channel and a structured output surface 23 of the channel 25 ejecting the liquid stream 22. Preferably, the struts and/or rips have a length longer than the second length L2. Moreover, the second width W2 is about 0.8 mm, whereas the inner diameter of the first nozzle element 10 according to the prior art is about 0.65 mm. The first nozzle element 1 in FIG. 2b has a collecting area 13 and refers to a nozzle system 1 named EA 5682 in the following. Its second width W2 is about 0.7 mm. The first length L1 is about 3 to 5 mm and the second length L2 about 2 to 3 mm. A third length L3 assigned to the collecting part 13 is about 0.3 to 0.7 mm and the third width is about 1 mm. Furthermore, it is provided that the transition between the collecting part 13 and the acceleration part 11 is funnel shaped. Moreover, the third width W3 being for example about 1 mm is larger than the second with being for example about 0.7 mm. The first width is about 0.61 mm.

Figure 2C:
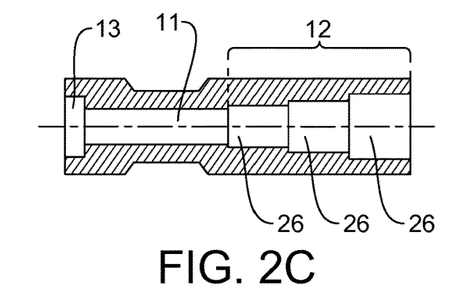

The first nozzle element 10 of FIG. 2c is for example part of a nozzle system 1 assigned to the name EA-5701. The first nozzle element 10 of FIG. 2c differs from that of FIG. 2b by the design of the inner curvature/side 14 of the spreading part 12, wherein the inner curvature/side along the transporting direction T has a step like shape. In the illustrated embodiment, several subsection, in particular three subsection 25, are provided, wherein the sub-sections 25 have the same length measured along the transporting direction T. For example, the length of each subsection is about 1.5 mm, consequently forming a second length L2 of about 4.5 mm. Furthermore, it is preferably provided that a respective second width W2 assigned to each of the subsection increases along the transporting direction T. For example the second width W2 is increased by 0.2 mm by each transition from one subsection 26 to the next subsection 26 in transporting direction T. Alternatively, it is also convincible that the enlargement of the second width W2 between adjacent subsections 26 and/or the length of each subsection 26 differs along the transporting direction T.

Figure 2D:
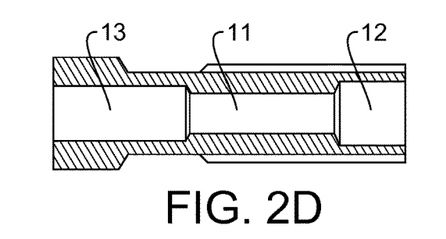

In FIG. 2d a further first nozzle element 10 is presented and this first nozzle element is part of the nozzle system called EA-5697 in the following. Compared to the embodiment of FIG. 2b, a longer collecting part 13 is provided. Furthermore, it is provided that the third width W3 being for example about 0.8 mm is smaller than the second with W2 being for example about 1 mm.

Figure 3:
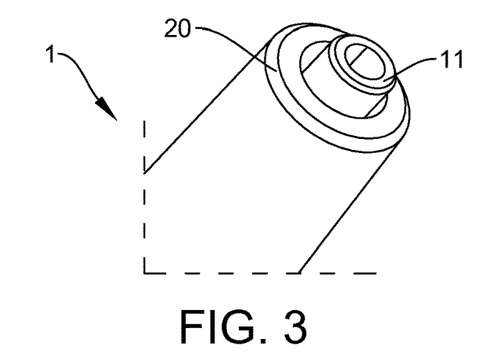

In FIG. 3 a front end FE of a nozzle system 1 according to the prior at is presented in a perspective view for comparing it to front ends FE of nozzle systems 1 of the FIGS. 3a to 3i representing different exemplary embodiments of nozzle system 1 according to the present disclosure. In particular, the view at the front end FE shows the fourth cross section formed at the end of the channel 25 for ejecting the liquid stream 22. The nozzle system 1 representing the prior art is called in the following EMS. This nozzle system 1 is ring-shaped and has no structures included in the channel 25 for forming a profiled fourth cross section. In contrast to that, the channel 25 of the nozzle systems 2 illustrated by the FIGS. 3a to 3h is formed by several sub-channels, in particular groove like sub-channels, between the first nozzle element 10 and the second nozzle element 20. The sub-channels extends preferably parallel to the transporting direction T and their ends at the front end of the nozzle system 1 forms the fourth cross section. In particular, the sub-channels have a fourth length L4 measured in a direction extending parallel to the transporting direction T. Preferably, the fourth length L4 is determined by the length of rip elements and/or strut elements 17 protruding from the first nozzle element 10 radially. For example, the fourth length L4 is longer than the second length L2. In particular, a ratio of the second length L2 to the fourth length L4 is larger than 1, preferably larger than 2 and most preferably larger than 3.

In particular, the struts elements 17 are part of the first nozzle element 10. Moreover, it is provided that the outer surface/side 15 of the first nozzle element 10 has an arched shape between two adjacent strut elements 17. In particular the first nozzle element 10 includes grooves 35 for forming the sub-channels. Thereby the outer surface/side 15 of the first nozzle element 10 is shaped/curved inwardly. In the nozzle systems of the FIGS. 3a to 3d the arched shape is mainly parabolic and six different sub-channels are formed by six radially extending strut elements 17. The nozzle system of the FIGS. 3a to 3d mainly differs from each other by the thickness of a wall assigned to the first nozzle element 10.

Figure 3A:
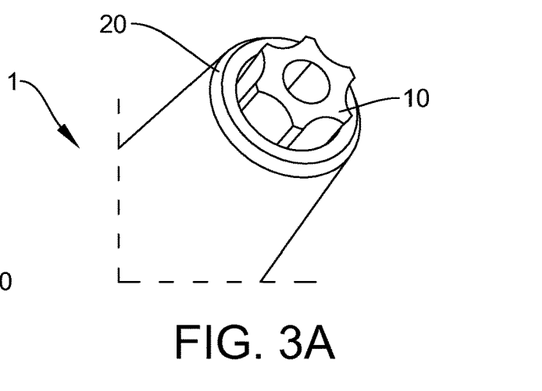
Figure 3B:
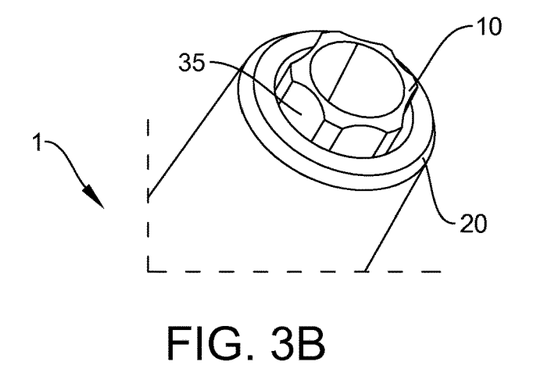
Figure 3C:
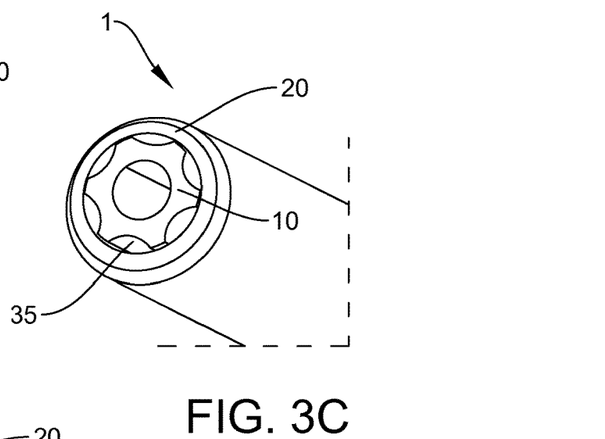
Figure 3D:
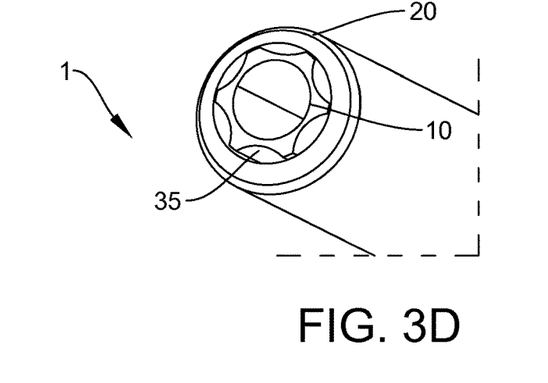
Figure 3E:
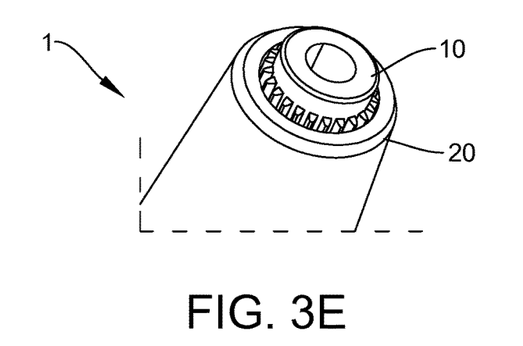
Figure 3F:
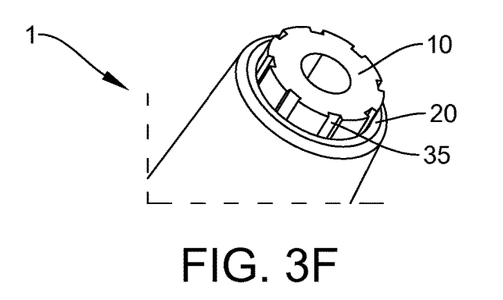
Figure 3G:
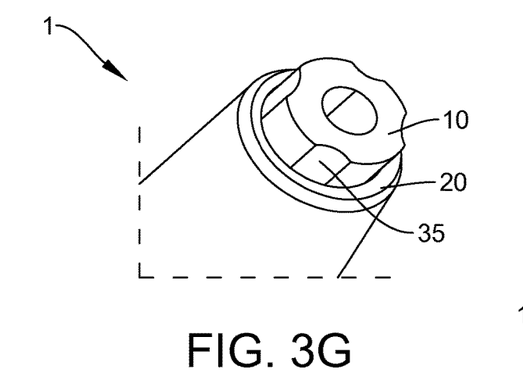
Figure 3H:
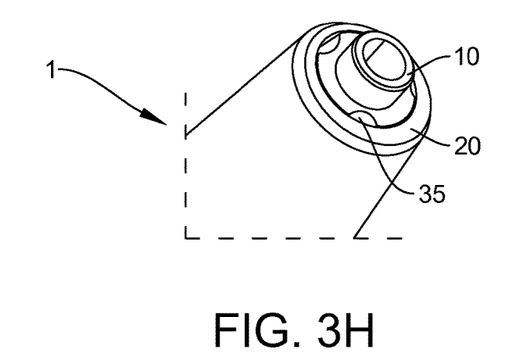
Figure 3I:
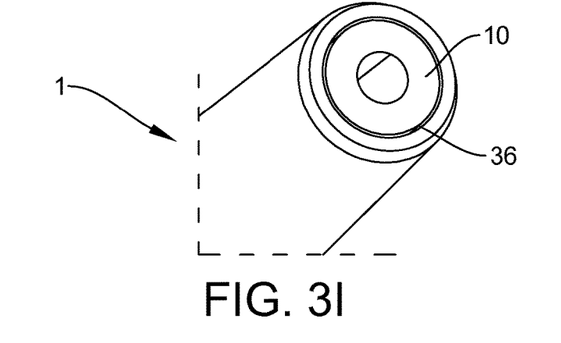

In the FIGS. 3e and 3f more than six sub-channels are realized. In the FIGS. 3f and 3g are less than six sub-channels formed and the arched shape is mainly like a circular arc. In FIG. 3i the fourth cross section is formed by a slit 36.

Furthermore, the nozzle system of FIG. 3a refers to EA 5682, the nozzle system of FIG. 3b to EA 5701, the nozzle system of FIG. 3c to EA 5698 and the nozzle system of FIG. 3d to EA 5697. For those nozzle systems an abrasivity of the output stream 1 was measured and compared to the abrasivity of the nozzle system named EMS. Abrasivity test is carried out by using a test bench where the nozzle is placed at 45° and 2 mm of projected distance. A shutter in front of the nozzle is used to determine the exposure time. To determine the abrasivity, the test material is a PMMA plate. 16 abrasion points are made for each test using the same application time. In order to avoid experimental bias, the exposure time is adjusted to get abrasion holes of 20 to 200 microns. The exposure time is mostly between 1 and 5 seconds. This exposure time is not a key parameter as the outcome is normalized according to the powder amount used. Therefore the abrasivity is defined as the crater depth generation rate over powder quantity. Abrasivity=Crater depth [μm]/powder quantity used [g]

The abrasivity of EMS had a value between 1700 and 2333 μm/g, EA-5682 had a value between 1300 and 1600 μm/gm, EA-5701 had a value between 900 and 1100 μm/g, EA-5698 had a value between 700 and 1100 μm/g and ES 5697 had a value between 400 and 600 μm/g.

Figure 4:
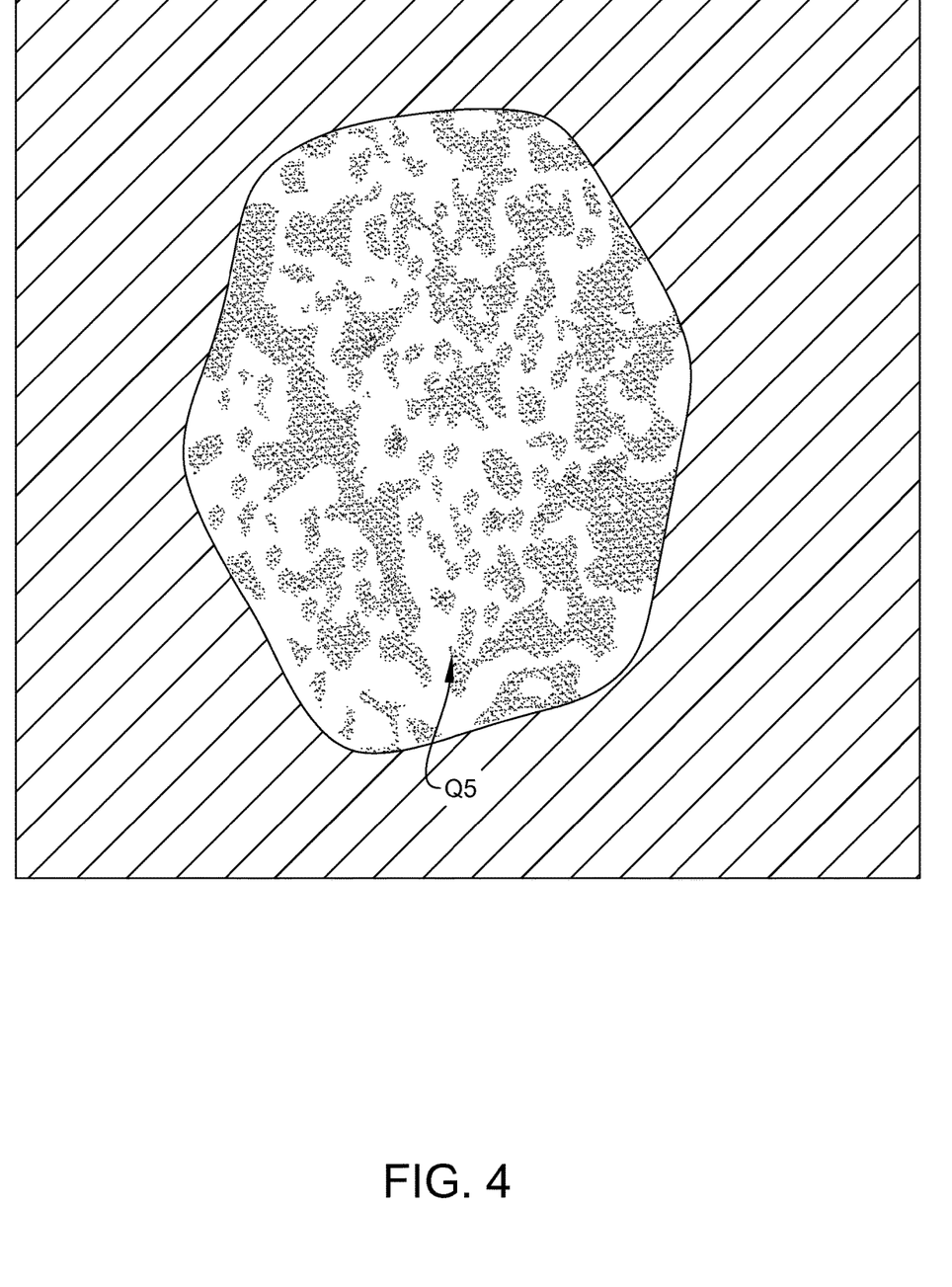

In FIG. 4 a fifth cross section Q5 assigned to the output stream realized by EA-5701 is shown. The fifth cross section of the output stream is visualized by directing the output stream 2 on a painted steel surface located at a distance of 2.2 mm from the front end FE of the nozzle system 1. It can be seen that the fifth cross section differs from a circularly formed cross section.

The invention claimed is:

1. Nozzle system for a powder blasting device, namely a powder jet device for dental treatments, comprising
a first nozzle element for transporting a powder-gas mixture stream along a transporting direction and
a second nozzle element, wherein the second nozzle element surrounds the first nozzle element such that at least one channel is formed between the first nozzle element and the second nozzle element, wherein the at least one channel is provided for transporting a liquid stream, wherein the first nozzle element and the second nozzle element are arranged such that in operation the powder-gas-mixture stream ejected by the first nozzle element is encased by the liquid stream ejected by the at least one channel for forming an output stream of the nozzle system, wherein the first nozzle element and the second nozzle element terminate at a front end of the nozzle system or, wherein the first nozzle element protrudes at the front end of the nozzle system
wherein the first nozzle element has an acceleration part having a first cross section and a spreading part having a second cross section, wherein the spreading part is arranged downstream of the acceleration part, characterized in that the second cross section is larger than the first cross section and that the liquid stream is ejected from an output surface such that the powder jet device is encased by droplets.

2. The nozzle system according to claim 1, wherein the first cross section of the acceleration part is constant in a direction extending along the transporting direction and/or the second cross section of the spreading part is at least partially constant in a direction extending along the transporting direction.

3. The nozzle-system according to claim 1, wherein the first cross section has a first width measured perpendicular to the transporting direction and the second cross section has a second width measured perpendicular to the transporting direction, wherein the second width is up to three times larger than the first width and/or wherein the first width has a width between 0.1 and 2.5 mm.

4. The nozzle system according to claim 1, wherein the first nozzle element comprises a collecting part, wherein the collecting part is arranged upstream to the acceleration part, wherein the collecting part has a third cross section being at least partially constant along the transporting direction.

5. The nozzle system according to claim 4, wherein the third cross section is larger than the first cross section, wherein a third width of the third cross section is up to three times larger than a first width of the first cross section, wherein the first width has a width between 0.1 and 2.5 mm.

6. The nozzle system according to claim 1, wherein an inner curvature of the first nozzle element in a transition area or in the spreading part has a step and/or a cone shape.

7. The nozzle system according to claim 1, wherein the acceleration part has a first length measured along the transporting direction and the spreading part has a second length measured along the transporting direction, wherein the second length is 0.5 to 3.5 times longer than the first length.

8. The nozzle system according to claim 1, wherein the liquid stream is ejected from the channel via the output surface, wherein the channel is configured such that the liquid stream encasing the powder-gas mixture stream is formed by droplets.

9. The nozzle system according to claim 8, wherein the output surface has a fourth cross section, wherein the fourth cross section has a size between 0.1 and 0.9 mm$^2$.

10. Powder blasting device comprising the nozzle system according to claim 1.

11. The nozzle system according to claim 9, wherein the fourth cross section is formed as a slit, an assembly of holes and/or assembly of grooves.

12. A nozzle system for a powder blasting device, namely a powder jet device for dental treatment, comprising
a first nozzle element for transporting a powder-gas mixture stream along a transporting direction and
a second nozzle element, wherein the second nozzle element surrounds the first nozzle element such that at least one channel is formed between the first nozzle element and the second nozzle element, wherein the at least one channel is provided for transporting a liquid stream, wherein the first nozzle element and the second nozzle element are arranged such that in operation the powder-gas-mixture stream ejected by the first nozzle element is encased by the liquid stream ejected by the at least one channel via an output surface for forming an output stream of the nozzle system,
wherein the first nozzle element has an acceleration part having a first cross section and a spreading part having a second cross section, wherein the spreading part is arranged downstream of the acceleration part, characterized in that the second cross section is larger than the first cross section,
wherein the first nozzle element and the second nozzle element terminate at a front end of the nozzle system or, wherein the first nozzle element protrudes at the front end of the nozzle system, wherein the output surface has a third cross section, wherein the third cross section has a size between 0.3 and 0.4 mm2, such that the liquid stream is ejected from the output surface such that the powder jet device is encased by droplets.

13. The nozzle system according to claim 12, wherein the third cross section is formed as a slit, an assembly of holes and/or assembly of grooves.

14. The nozzle system according to claim 12, wherein an outer curvature of the first nozzle element defines the shape of the third cross section, wherein the outer curvature of the first nozzle element comprises at least one recess being curved inwardly.

15. The nozzle system according to claim 12, wherein in a direction parallel to the transporting direction the first nozzle element extends further than the second nozzle element or the first nozzle element and/or the second nozzle element ends at a common plane being perpendicular to the transporting direction.

* * * * *